May 19, 1970  H. E. STULLER  3,512,277
CONTROL SYSTEM FOR TWO-ENGINE VEHICLE
Filed March 15, 1967  2 Sheets-Sheet 1

*INVENTOR*
HOWARD E. STULLER
BY *Kenneth C. Witt*
ATTORNEY

INVENTOR
HOWARD E. STULLER
BY Kenneth C. Witt
ATTORNEY

# United States Patent Office 3,512,277
Patented May 19, 1970

3,512,277
CONTROL SYSTEM FOR TWO-ENGINE VEHICLE
Howard E. Stuller, Lubbock, Tex., assignor to Clark
Equipment Company, a corporation of Michigan
Filed Mar. 15, 1967, Ser. No. 623,397
Int. Cl. B60p 1/36; F15b 15/18
U.S. Cl. 37—8                                                7 Claims

ABSTRACT OF THE DISCLOSURE

A control system for a vehicle having two engines. One engine is utilized to propel the vehicle in the usual manner. The present control system may be operated to cause the second engine to help propel the vehicle, or to drive an auxiliary mechanism, or both, or neither. The control system includes a two-position control device connected to the second engine, and a three-position control device. The position of the two-position control device is dependent upon the position of the three-position control device which is arranged to selectively (1) connect the second engine for operation with the first engine in propelling the vehicle but with the auxiliary mechanism disconnected, (2) disable the second engine from propelling the vehicle and also from driving the auxiliary device, (3) connect the second engine for driving the auxiliary mechanism but not propelling the vehicle, and (4) connect the second engine for both propelling the vehicle and operating the auxiliary mechanism.

---

This invention relates to vehicles having two propelling engines plus an auxiliary mechanism thereon which must be operated during at least part of the time when the vehicle is in motion. As disclosed herein in a preferred form in compliance with the patent statutes it relates to a self-propelled elevating scraper having two engines, one engine arranged to drive the front wheels and the other engine arranged to drive the rear wheels, or the elevator, or both, or neither. It should be understood, however, that this invention is not limited to elevating scrapers.

It was known heretofore to utilize two engines for propelling an elevating scraper, one engine for driving the front wheels and the other for driving the rear wheels. It was also known heretofore to operate the elevator of an elevating scraper in various ways such as by a mechanical drive from a power takeoff on the front engine, by a hydraulic motor, by an electric motor or by a separate engine used only for that purpose.

The present invention provides a control system whereby the second engine on the rear of the vehicle can be operated by the operator of the vehicle in such a manner that it (1) operates the rear wheels of the vehicle in synchronism with the front wheels which are driven by the other engine, (2) operates the elevator mechanism, (3) operates both the rear wheels and the elevator mechanism, or (4) operates neither.

In carrying out this invention in one peferred form thereof, I provide a control system for a vehicle having first and second engines and an auxiliary mechanism which may be driven by the second engine, the control system including drive control means for operating only the first engine or both engines depending on the position of a two-position control device which is connected between the drive control means and the second engine. The position of the two-position control device in turn is dependent on the position of another three-position control device which is arranged to selectively (1) connect the second engine for operation with the first engine but with the auxiliary mechanism disconnected, (2) disable the second engine from propelling the vehicle and also from driving the auxiliary device, (3) connect the second engine for driving the auxiliary mechanism but not propelling the vehicle, and (4) connect the second engine for both propelling the vehicle and operating the auxiliary mechanism, the last-mentioned operating condition requiring the use also of an overriding control device.

For a clearer and more complete understanding of my invention reference should be had to the accompanying drawing wherein.

Figure 1:
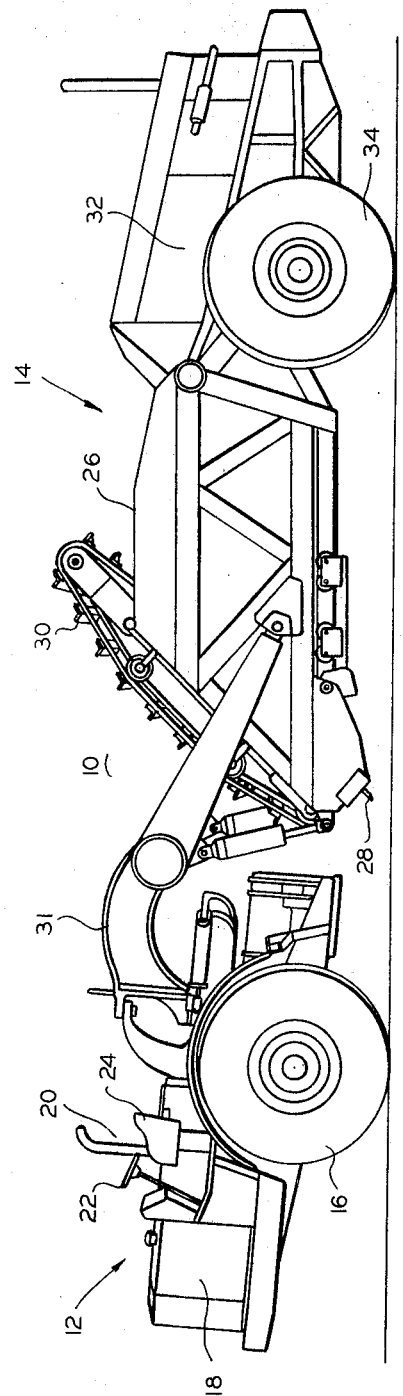
FIG. 1 shows a side elevation of an elevating scraper with two engines.

The numeral 10 in FIG. 1 designates generally an articulated vehicle composed of a two-wheeled tractor portion 12 and a two-wheeled trailer portion 14. The tractor portion 12 includes a pair of rubber-tired wheels 16 (only one of which is visible) mounted at the outer ends of a transverse drive axle, an internal combustion engine or other prime mover (not visible) within an enclosure 18, an operator's station 20 including a steering wheel 22 and a seat 24, and other parts described in greater detail hereinafter.

The trailer portion of the vehicle illustrated is in the form of a scraper for loading, transporting and unloading earth or other material, and includes a main bowl or box portion 26 having a cutting edge 28, an endless chain elevator 30 for moving material from the cutting edge upwardly and rearwardly into the box portion, and other parts including a yoke or gooseneck portion 31 for connecting the trailer 14 to the tractor 12. The trailer portion 14 also includes a second internal combustion engine or other prime mover within enclosure 32 and a pair of rubber-tired wheels 34 (only one of which is visible) mounted at the outer ends of a rear drive axle.

Figure 2:
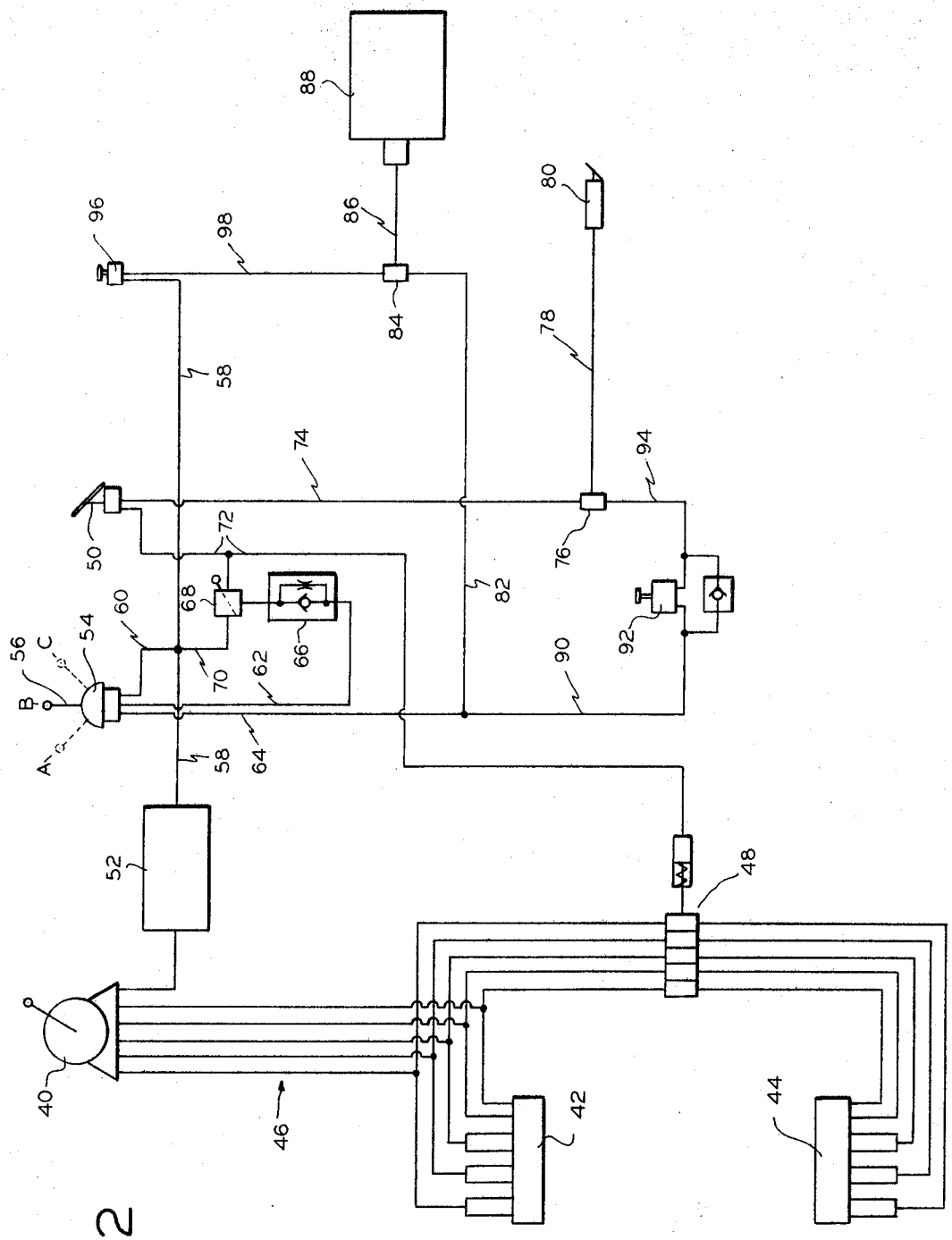
FIG. 2 shows schematically the control system of my invention.

To operate the elevating scraper 10 there is provided a control system illustrated schematically in FIG. 2. As shown, this is a compressed air system although it could be operated elecitrically, hydraulically or by other equivalent means if desired without departing from the present invention. In the illustrated vehicle the compressed air is derived from reservoir 52 which is provided for the vehicle brakes but another suitable source could be used if desired. The control system includes a number of devices as explained in detail hereinafter; these devices which must be operated by the vehicle operator are located at the operator's station 20.

The control system includes a device indicated by numeral 40, located at the operator's station, the device 40, being referred to herein as a drive control device. In the vehicle and control system illustrated, this device enables the operator to connect the front engine for driving the front wheels and also the rear engine for driving the rear wheels, the connection in each case being made through a power shift transmission with an air control of known type. See for example U.S. Pat. No. 2,640,368. The air control for the transmission for the front engine (within enclosure 18) is indicated by the numeral 42 in FIG. 2, while the air control for the transmission for the rear engine is indicated by the numeral 44. A plurality of air connections indicated generally by the numeral 46 interconnect drive control device 40 and transmission operating devices 42 and 44, and a two-position control device 48 is provided in the connections to transmission operating device 44. In one position of device 48 air is cut off from transmission control device 44 which causes the transmission for the rear engine to assume a neutral position whereby the rear engine does not drive the rear wheels. When device 48 is in the other position, both the transmission control devices 42 and 44 assume a ratio position selected by the operator through drive control device 40, or if the transmission control device 44 was in neutral when such connection is made then the transmission control device 44 shifts its transmission to the same or corresponding ratio as the transmission for the front engine so that the two engines operate the two sets of wheels in synchronism.

It should be understood that the drive control device 40 controls only the connection of the engines to drive their respective wheels, through transmissions if such are provided, and it does not control the speed of the engines. The speed of the engines is controlled in the usual manner by movable throttle control devices. Such a device is not shown for the front engine, but the throttle control device for the rear engine is illustrated at 50. It will be understood by those familiar with operating vehicles with two engines that this throttle control device can be readily mechanically interlocked with the throttle control device for the front engine so that the throttle for the rear engine is operated simultaneously with the throttle for the front engine, but that it is possible to operate the throttle for the front engine without operating the throttle for the rear engine. For this it is necessary only to have two pedals side by side and an interlock between them so arranged that when the foot throttle for the rear engine is operated it simultaneously depresses the throttle for the front engine, but when the foot throttle for the front engine is operated that for the rear engine is not depressed.

The control system includes a three-position control device 54 which is likewise located at the operator's station 20 on the vehicle. This control device has three positions which are illustrated by the positions A, B and C of lever 56 on the device. In position B, the center position, the rear engine is disconnected from and does not drive the rear wheels and it is also disconnected from and does not drive the elevator. In position A on the left the engine is connected to and drives the rear wheels but does not drive the elevator. In position C on the right the engine is connected to and drives the elevator but does not drive the rear wheels. The fourth operating condition, that is, when the rear engine drives both the elevator and the rear wheels is obtained in a manner described hereinafter.

Three-position control device 54 receives a supply of air under pressure from reservoir 52 through conduits 58 and 60. When control device 54 is in the position corresponding to B on the schematic drawing of FIG. 2, no pressurized air is transmitted through the control device 54 to either of conduits 62 and 64 which lead from such control device. This leaves two-position control device 48 in the position illustrated in the drawing in which transmission control 44 is cut off from drive control device 40. Likewise, there is no connection to the drive mechanism for the elevator, and this will be understood from the subsequent explanation.

When three-position control device 54 is moved to position A, conduit 62 is energized with the pressurized air. Such air is routed through a choke valve 66 to open a pilot valve 68. Such opening admits pressurized air from conduit 58 through conduit 70 to a conduit 72 which leads both to the rear engine foot throttle control device 50 and to two-position control device 48. Such action causes device 48 to move to its other position which connects transmission control device 44 in parallel with transmission control device 42, and transmission control device 44 then assumes the same position as transmission control device 42 and thereby connects the rear engine for driving the rear wheels in synchronism with the front wheels.

From foot throttle device 50 pressurized air is directed through a conduit 74 to a shuttle valve 76 which opens and admits such pressurized air through conduit 78 to the throttle valve 80 which actually controls the speed of the rear engine, responsively to the position of foot throttle control device 50.

To operate the elevator from the rear engine control handle 56 is moved to position C. In this position conduit 62 is closed but pressurized air is admitted to conduit 64 from whence it flows through a conduit 82 to a shuttle valve 84 which opens and allows the pressurized air to flow through conduit 86 to 88 which illustrates schematically a hydrostatic drive system for the elevator, pressurized air conduit in 86 causing such hydrostatic drive system to operate and turn the elevator 30 to aid in the moving of material into the scraper box. When the control system is in this condition the rear engine is not driving the rear wheels. The speed of the rear engine in this condition is controlled by means of pressurized air which is admitted through a conduit 90 to a hand set speed control valve 92 from which the pressurized air in turn passes through conduit 94 to shuttle valve 76 which opens and admits pressurized air through conduit 78 to the throttle valve 80 of the rear engine. Thus the rear engine drives the elevator at a speed which is determined by the setting of speed control valve 92.

The fourth condition of operation is with the rear engine driving both the rear wheels and the elevator. This is accomplished by shifting three-position control device 54 back to position A whereupon the engine is connected to drive the rear wheels in the same manner described previously. The engine can also be connected to drive the elevator under these circumstances by operating an override valve 96 which admits pressurized air from conduit 58 through a conduit 98 which actuates shuttle valve 84 to admit such air through conduit 86. This causes the operation of the hydrostatic drive 88 of the elevator in the same manner as previously described. Thus the rear engine operates both the rear wheels and the elevator simultaneously, the speed of the rear engine being controlled in the same manner as when the rear engine is driving only the rear wheels. It will be appreciated that this invention is not limited to a hydrostatic drive for the elevator but that any other equivalent drive can be employed.

This invention provides a control system which permits a second engine on the rear of an elevating scraper to be utilized in the most versatile manner to assist the front engine. Under certain conditions of loading, transporting and dumping of the material it may be beneficial to operate the second engine to assist the first engine in propelling the vehicle, particularly if the ground is soft and does not provide good traction. Under such conditions driving both front and rear wheels increases the tractive effort thereby decreasing the time required for the loading, transporting or discharging operation as the case may be. More power and more tractive effort also provides greater acceleration, particularly when the vehicle is loaded, and this also cuts down the total time of an operating cycle. The rear engine is utilized to operate the elevator normally during loading, but under some conditions of loading it is unnecessary to utilize all of the power of the rear engine for such elevator, and with the present control system such excess power can be utilized to help propel the vehicle.

While the invention has been described and illustrated herein on the basis that it is the rear engine which drives the elevator under certain circumstances, it will be readily appreciated by those familiar with vehicles of this type that it is possible to utilize the front engine for driving the elevator instead of the rear engine, without departing from the present invention. In fact, it is possible to operate the elevator from both the front and the rear engines. Also, while the invention has been described in terms of utilizing gear type mechanical transmissions connected between the engines and their respective vehicle wheels it will be understood by those skilled in the art that electric drive, hydrostatic drive or other equivalent drive arrangements could be used in place of such mechanical drive.

I wish it to be understood that I do not desire to be limited to the exact details of construction shown and described, for obvious modifications will occur to a person skilled in the art.

I claim:
1. A control system for a vehicle having a first engine for driving certain wheels thereof, a second engine for driving certain other wheels thereof, and an auxiliary mechanism which may be driven by the second engine, the control system comprising a drive control device for operating the first engine to drive its wheels and for simultaneously operating the second engine to drive its wheels, means including a two-position control device for permitting driving operation of the said second engine in one position thereof and preventing such operation in its other position, drive means for the auxiliary mechanism, a three-position control device connected to the said two-position control device and to the said auxiliary mechanism drive means, the said three-position control device in one position thereof causing the said two-position control device to be in its said one-position and the said auxiliary mechanism drive means inactive, in a second position thereof causing the said two-position control device to be in its said other position and the said auxiliary mechanism drive means inactive, and in its third position causing the said two-position control device to be in its said other position and the said auxiliary mechanism drive means active.

2. A control system as specified in claim 1 which includes override means for activating the said auxiliary mechanism drive means even though it is not actuated from the said three-position control device.

3. A control system as specified in claim 2 in which the control system is air actuated and includes connections to an air reservoir, and the said override means includes means for bypassing the said three-position control device and supplying air directly from the resorvoir to the said auxiliary mechanism drive means.

4. A control system for a vehicle having a first engine and a first transmission associated therewith for driving the front wheels of the vehicle, a second engine having a throttle valve and a second transmission associated therewith for driving the rear wheels of the vehicle, and an elevator mechanism having drive means which may be operated by the second engine, the control system comprising connections to a source of pressurized air, first air controlled means for operating the first transmission, second air controlled means for operating the said second transmission, a drive control device connected to the said source of pressurized air and to the said first air controlled means for operating the first transmission and to the said second air controlled means for operating the second transmission, a two-position air operated control device in the said connection between the said drive control device and the said second transmission for permitting operation of the said second transmission in one position thereof and preventing such operation in its other position, a three-position air control device, a foot throttle device for the second engine, a shuttle valve connected to the elevator mechanism drive means, conduit means connecting said three-position control device with the said two-position control device and the said foot throttle device and the said shuttle valve, the said three-position control device in a first position thereof actuating the said two-position control device to its said one position whereby the second engine is connected through the second transmission for operating the rear wheels and simultaneously supply air under pressure through the said foot throttle device or the operation of the throttle valve for the second engine, the said three-position control device in another position thereof supplying pressurized air to the said shuttle valve for actuating the said elevator mechanism drive means, the said three-position control device in a third position thereof being operatively disconnected from the said two-position control device and from the said foot throttle device and the said shuttle valve whereby the rear engine drives neither the rear wheels nor the elevator mechanism.

5. A control system as specified in claim 4 which includes an override valve for bypassing the said three-position air control device and supplying pressurized air directly from the source thereof to the said shuttle valve for causing the second engine to drive the elevator mechanism regardless of the position of the three-position air control device.

6. A control system as specified in claim 4 in which the said conduit means include a pilot valve connected between the source of pressurized air and the said foot throttle device and said two-position control device, and a choke valve connected between the said three-position control device and the said pilot valve.

7. A control system as specified in claim 4 in which a second shuttle valve is connected between the said foot throttle device and the said throttle valve for the second engine, and a hand set speed control valve is connected between the said three-position control device and the said second shuttle valve for controlling the speed of the second engine in the said second position of the three-position control device when the second engine is operating the said elevator mechanism.

References Cited

UNITED STATES PATENTS

| | | | |
|---|---|---|---|
| 3,148,506 | 9/1964 | Moyer et al. | |
| 3,184,919 | 5/1965 | Vinton et al. | 37—126 |
| 3,296,715 | 1/1967 | Jass et al. | 37—8 |
| 3,346,972 | 10/1967 | Johnson | 37—8 |
| 3,381,396 | 5/1968 | Klein | 37—8 |
| 3,386,344 | 6/1968 | Junck et al. | |

ROBERT E. PULFREY, Primary Examiner

E. H. EICKHOLT, Assistant Examiner

U.S. Cl. X.R.

37—129; 60—52, 97

PO-1050
(5/69)

UNITED STATES PATENT OFFICE
CERTIFICATE OF CORRECTION

Patent No. 3,512,277　　　　　　　　　　Dated May 19, 1970

Inventor(s)　　　Howard E. Stuller

It is certified that error appears in the above-identified patent and that said Letters Patent are hereby corrected as shown below:

Column 2, line 44, "these" should read --those--.

Column 6, Claim 4, line 9, "or" should read --for--.

SIGNED AND
SEALED
SEP 1 - 1970

(SEAL)
Attest:

Edward M. Fletcher, Jr.
Attesting Officer

WILLIAM E. SCHUYLER, JR.
Commissioner of Patents